United States Patent
Bataille et al.

(12) 
(10) Patent No.: US 6,668,987 B2
(45) Date of Patent: Dec. 30, 2003

(54) SHOCK ABSORBER

(75) Inventors: Alain Bataille, Paris (FR); Louis Sinbandhit, La Celle Saint Cloud (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/815,258

(22) Filed: Mar. 22, 2001

(65) Prior Publication Data
US 2002/0134629 A1 Sep. 26, 2002

(51) Int. Cl.[7] .............................. F16F 9/34; F16F 9/50
(52) U.S. Cl. .............. 188/282.5; 188/322.15; 188/322.22; 188/322.13
(58) Field of Search .......................... 188/282.5, 282.6, 188/282.1, 322.15, 322.22, 317, 322.13; 137/315.01, 493.8

(56) References Cited

U.S. PATENT DOCUMENTS

| | | | |
|---|---|---|---|
| 3,584,651 A | * | 6/1971 | Paschke |
| 4,627,464 A | * | 12/1986 | Hartshorn |
| 4,830,152 A | * | 5/1989 | Rauert et al. |
| 4,899,855 A | | 2/1990 | de Carbon ............ 188/322.15 |
| 5,709,290 A | * | 1/1998 | Ekert et al. |
| 6,247,563 B1 | * | 6/2001 | De Carbon et al. |
| 2001/0029981 A1 | * | 10/2001 | Penza |

FOREIGN PATENT DOCUMENTS

| | | |
|---|---|---|
| EP | 0762013 A | 3/1997 |
| GB | 2356913 * | 6/2001 |
| WO | 98/02673 A | 1/1998 |

\* cited by examiner

*Primary Examiner*—Douglas C. Butler
(74) *Attorney, Agent, or Firm*—Scott A. McBain

(57) ABSTRACT

A shock absorber for a motor vehicle includes a compression valve having one or more deflectable discs mounted on the piston on the rebound chamber side. It also includes a rebound stroke valve having one or more deflectable discs mounted on the piston on the compression chamber side. The deflectable discs of the compression stroke valve have fluid flow apertures aligned with the rebound flow passage. The compression stroke valve also has an annular stop member and an annular orientation disc positioned between the stop member and the deflectable discs on the side of the deflectable discs remote from the piston. The stop member and the orientation disc have fluid flow apertures aligned with fluid flow apertures in the deflectable discs. An orientation disc has a pin folded therefrom and extending in a direction substantially parallel to the longitudinal axis, the pin extending through corresponding apertures formed in the deflectable discs into a corresponding slot formed in the piston. Alignment pins are formed on the orientation disc and the stop member for aligning the orientation disc relative to the stop member, allowing easier alignment of the compression stroke valve components.

5 Claims, 3 Drawing Sheets

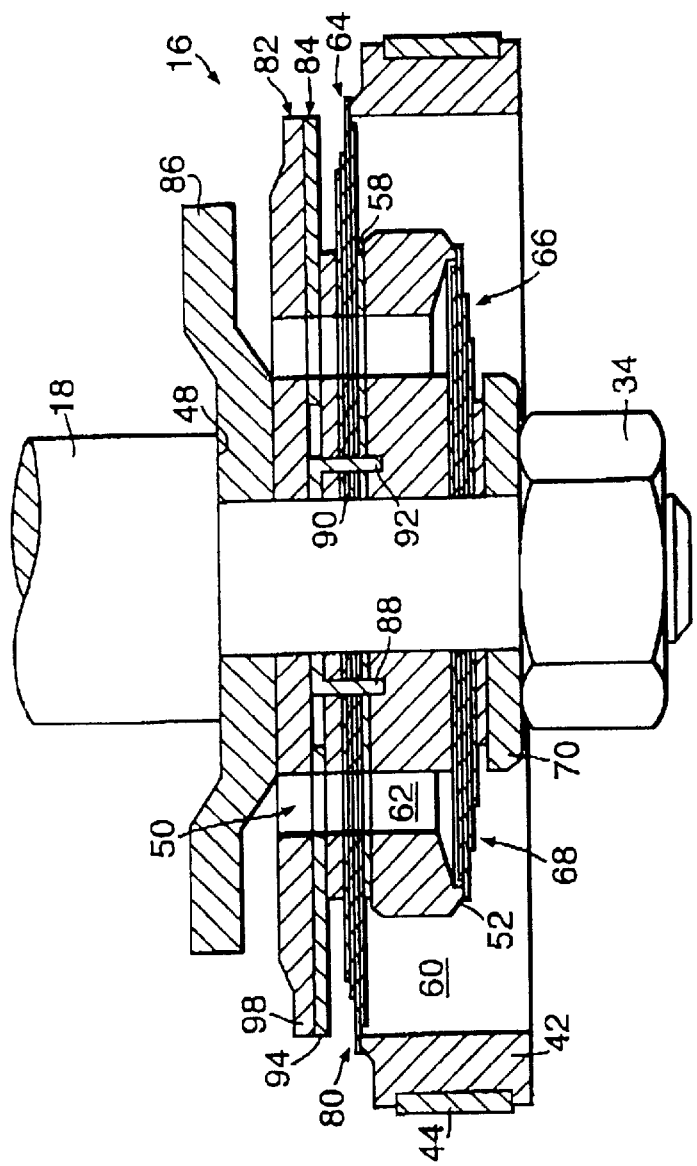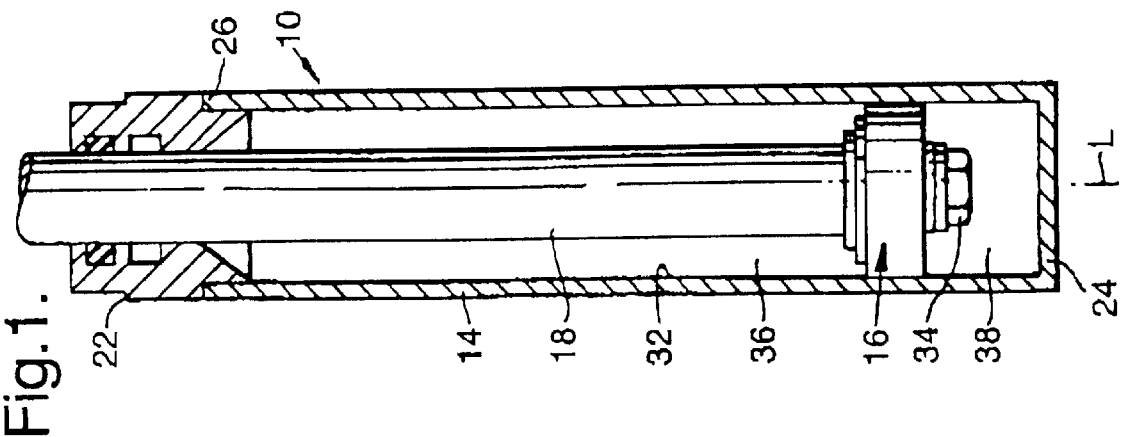

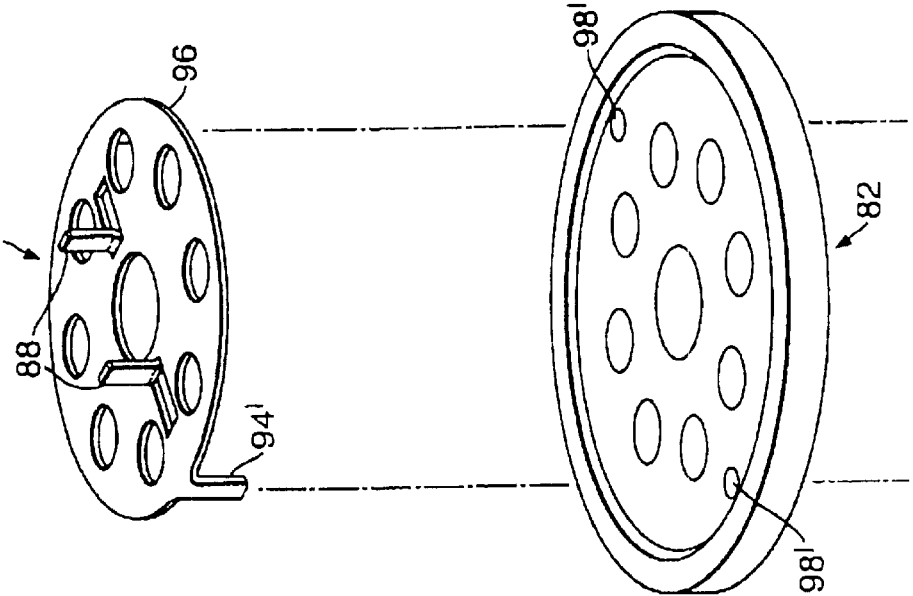
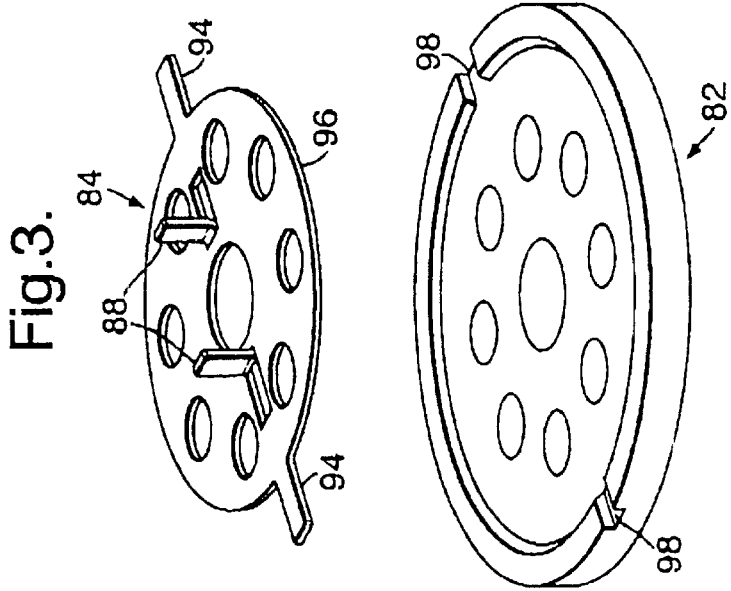

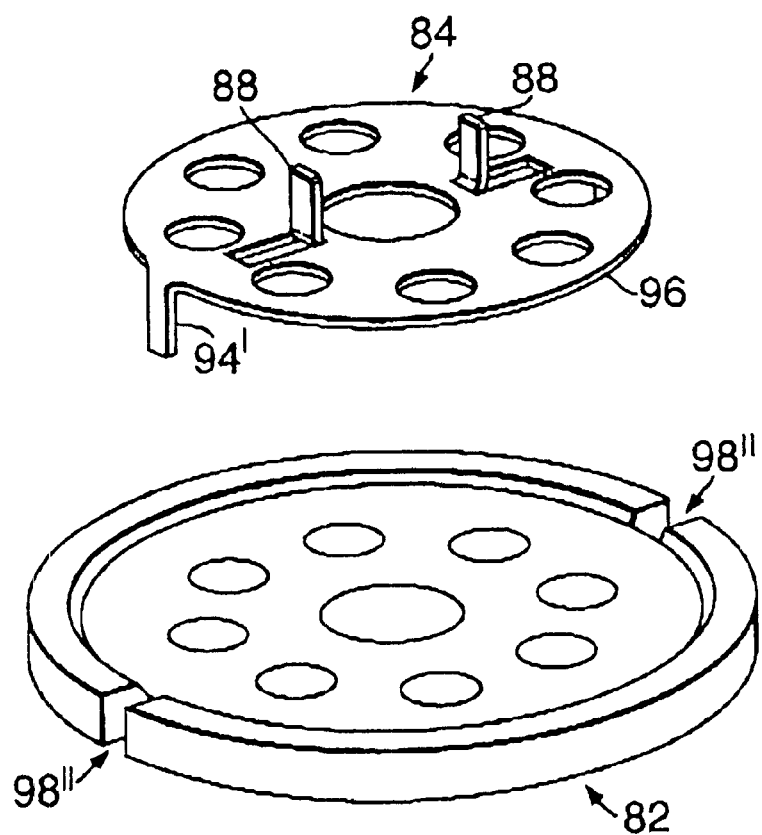

SHOCK ABSORBER

TECHNICAL FIELD

The present invention relates to a shock absorber for the suspension system of a motor vehicle.

BACKGROUND OF THE INVENTION

Known shock absorbers comprise a tube; a piston sealably slidably mounted in the tube and attached to a piston rod, the piston separating a compression chamber from a rebound chamber within the tube; a compression stroke valve mounted on the piston; and a rebound stroke valve mounted on the piston. The compression stroke valve acts as a one way valve to allow flow of fluid from the compression chamber to the rebound chamber through one or more compression flow passages in the piston during the compression stroke of the shock absorber. The rebound stroke valve acts as a one way valve which allows flow of fluid from the rebound chamber to the compression chamber through one or more rebound flow passages in the piston during the rebound stroke of the shock absorber. Typically, the valves comprise a number of discs which cover the flow passages during low speed strokes and which deflect to allow fluid flow during strokes above predetermined speeds. An annular stop member is used to prevent excessive deflection of the compression valve discs. One or more pins associated with the stop member pass through aligned apertures in the deflectable discs and into a corresponding aperture in the piston to provide correct orientation for the discs relative to the piston. The pins are either separately formed, which can create assembly problems, or are stamped out of the stop member, which can create manufacturing and tolerance problems.

SUMMARY OF THE INVENTION

It is an object of the present invention to provide a shock absorber which overcomes the above mentioned problems.

The present invention is particularly for a shock absorber having a single tube (sometimes referred to as a monotube damper). The present invention may, however, be adapted for use in a shock absorber having an inner tube and an outer tube (sometimes referred to as a twin-tube damper).

A shock absorber in accordance with the present invention comprises a tube substantially closed at both ends and containing fluid; a piston slidably mounted in the tube and making a sealing fit therewith, the piston separating a compression chamber and a rebound chamber within the tube; a piston rod attached to the piston, having a longitudinal axis, and extending through the rebound chamber and out of one end of the tube; a compression stoke valve comprising one or more deflectable discs mounted on the piston on the rebound chamber side thereof; a rebound stroke valve comprising one or more deflectable discs mounted on the piston on the compression chamber side thereof; a compression flow passage extending through the piston in a direction substantially parallel to the longitudinal axis of the piston rod, opening at one end into the compression chamber, and having an opening at the other end into the rebound chamber which is closable by the deflectable disc or discs of the compression stroke valve; and a rebound flow passage extending through the piston in a direction substantially parallel to the longitudinal axis of the piston rod, opening at one end into the rebound chamber, and having an opening at the other end into the compression chamber which is closable by the deflectable disc or discs of the rebound stroke valve; wherein the deflectable discs of the compression stroke valve have fluid flow apertures aligned with the rebound flow passage; and wherein the compression stroke valve further comprises an annular stop member; and an annular orientation disc positioned between the stop member and the deflectable discs on the side of the deflectable discs remote from the piston; the stop member and the orientation disc having fluid flow apertures aligned with the fluid flow apertures in the deflectable discs; the orientation disc having a pin folded therefrom and extending in a direction substantially parallel to the longitudinal axis, the pin extending through corresponding apertures formed in the deflectable discs into a corresponding slot formed in the piston; and alignment means formed on the orientation disc and the stop member for aligning the orientation disc relative to the stop member.

The present invention provides an arrangement in which the parts of the compression stroke valve can be easily and quickly aligned without tolerance or assembly problems.

BRIEF DESCRIPTION OF THE DRAWINGS

The present invention will now be described, by way of example, with reference to the accompanying drawings, in which:

FIG. 1 is a schematic cross-sectional view of a shock absorber in accordance with the present invention;

FIG. 2 is an enlarged cross-sectional view of the piston assembly of the shock absorber of FIG. 1;

FIG. 3 is a perspective view of the orientation disc and stop member of the compression stroke valve of the piston assembly shown in FIG. 2;

FIG. 4 is a perspective view of a first alternative arrangement for the orientation disc and stop member of a compression stroke valve of a piston assembly for a shock absorber in accordance with the present invention; and FIG. 5 is a perspective view of a second alternative arrangement for the orientation disc and stop member of a compression stroke valve of a piston assembly for a shock absorber in accordance with the present invention.

DESCRIPTION OF THE PREFERRED EMBODIMENT

Referring to the drawings, the shock absorber 10 shown in FIG. 1 is of the monotube damper type for use in a suspension system of a motor vehicle, and comprises a tube 14 having a longitudinal axis L, a piston assembly 16, a piston rod 18 having a longitudinal axis on axis L, and a rod guide 22. The piston assembly 16 will be described in greater detail below. The rod guide 22 may be any suitable conventional design well known to those skilled in the art, and will not be described in detail. The tube 14 is closed at one end 24, and is substantially closed at the other end 26 by the rod guide 22. The piston rod 18 extends through, and makes a sealing sliding fit with the rod guide 22. The piston assembly 16 makes a sealing sliding fit with the inner surface 32 of the tube 14. The piston rod 18 is secured to the piston assembly 16 by a nut 34 or any other suitable means. The piston assembly 16 divides the inner area of the tube 14 into a rebound chamber 36 and a compression chamber 38. The rebound and compression chambers 36 and 38 are substantially filled with fluid to damp reciprocating movement of the piston assembly 16 and piston rod 18 along axis L relative to the tube 14. The shock absorber 10 is mounted in a motor vehicle (not shown) in any suitable manner, and is part of the suspension system (not shown) for the motor vehicle.

The piston assembly 16 is shown in greater detail with reference to FIG. 2. FIG. 2 shows the piston 42 of the piston assembly 16 with an annular seal 44 made from TEFLON™ (polytetrafluoroethylene) material or any other suitable material. The piston 42 is preferably formed from sintered steel. The annular seal 44 provides a surface which makes a sealing sliding fit with the inner surface 32 of the tube 14. The piston 42 is substantially annular and has at least one passage 60 (which defines a compression flow passage) which passes through the piston 42. On assembly of the piston assembly 16 to the piston rod 18, the passage 60 extends in a direction substantially parallel to the axis L. Radially inward of the passage 60, at least one passage 62 (which defines a rebound flow passage) also passes through the piston 42. On assembly of the piston assembly 16 to the piston rod 18, the passage 62 extends in a direction substantially parallel to the axis L. The piston 42 has an end surface 58 directed towards the rebound chamber 36 and an end surface 52 directed towards the compression chamber 38. The passages 60,62 open through the end surfaces 58,52.

In addition to the piston 42 and seal 44, the piston assembly 16 comprises a compression stroke valve 64 and a rebound stroke valve 66. The compression stroke valve 64 comprises a number of deflectable discs 80, a stop member 82, an orientation disc 84, and a retaining washer 86, all of which are substantially annular. On assembly, the deflectable discs 80 are positioned adjacent the end surface 58 of the piston 42, the orientation disc 84 is positioned between the deflectable discs and the stop member 82, and the stop member is positioned between the orientation disc and the retaining washer 86. The retaining washer 86 engages a shoulder 48 on the piston rod 18. One of the deflectable discs 80 is sized to cover the compression flow passages 60 through the piston 42 and closes the compression flow passages in the rest position. The deflectable discs 80, orientation disc 84 and stop member 82 have fluid flow apertures 50 therethrough which align with, and have a similar diameter to, the rebound flow passages 62 in the piston 42 to allow substantially unrestricted fluid flow between the rebound flow passages 62 and the rebound chamber 36.

The rebound stroke valve 66 comprises a number of deflectable discs 68 and a retaining washer 70, all of which are substantially annular. On assembly, the deflectable discs 68 are positioned adjacent the end surface 52 of the piston 42. The retaining washer 70 is positioned adjacent the nut 34 on the end of the piston rod 18. The deflectable discs 68 and retaining washer 76 are sized so as not to cover the compression flow passages 60 to allow substantially unrestricted fluid flow between the compression flow passages 60 and the compression chamber 38. One of the deflectable discs 68 is sized to cover the rebound flow passages 62 through the piston 42 and closes the rebound flow passages in the rest position.

On compression stroke of the shock absorber 10, the deflectable discs 80 deflect to allow fluid flow from the compression chamber 38 through the compression flow passages 60 and into the rebound chamber 36. On rebound stroke of the shock absorber 10, the deflectable discs 68 deflect to allow fluid flow from the rebound chamber 36 through the fluid flow apertures 50 and the rebound flow passages 62 and into the compression chamber 38.

In order to ensure that the deflectable discs 80 of the compression stroke valve 64 are correctly aligned with each other and with the piston 42, in order to ensure that the fluid flow apertures 50 therein align with the rebound flow passages 62, the orientation disc 84 has at least one, and preferably two, pins 88 folded out from the plane of the orientation disc 84. When assembled, the pins 88 extend in a direction substantially parallel to the longitudinal axis L and pass through corresponding apertures 90 formed in the deflectable discs 80 into corresponding slots 92 formed in the end surface 58 of the piston 42.

In order to ensure that the stop member 82 of the compression stroke valve 64 is correctly aligned with the deflectable discs 80, in order to ensure that the fluid flow apertures 50 therein are aligned with each other and with the rebound flow passages 62, the orientation disc 84 has at least one, and preferably two, pins 94 which extend radially out from the outer edge 96 of the orientation disc 84. When assembled, the pins 94 are located in corresponding radially extending grooves 98 formed in the stop member 82.

Other arrangements may be used for aligning the orientation disc and the stop member, for example as shown in FIGS. 4 and 5, is which axially extending pins 94' on the orientation disc 84 pass into corresponding apertures 98' or slots 98" in the stop member 82.

The orientation disc 84 is preferably formed by stamping from sheet metal with the pins 88,94 being integrally formed during the stamping process.

What is claimed is:

1. A shock absorber comprising a tube substantially closed at both ends and containing fluid;

a piston slidably mounted in the tube and making a sealing fit therewith, the piston separating a compression chamber and a rebound chamber within the tube;

a piston rod attached to the piston, having a longitudinal axis, and extending through the rebound chamber and out of one end of the tube;

a compression stroke valve comprising at least one deflectable disc mounted on the piston on the compression chamber side thereof;

a compression flow passage extending through the piston in a direction substantially parallel to the longitudinal axis of the piston rod, opening at one end into the compression chamber, and having an opening at the other end into the rebound chamber which is closable by the at least one deflectable disc;

and a rebound flow passage extending through the piston in a direction substantially parallel to the longitudinal axis of the piston rod, opening at one end into the rebound chamber, and having an opening at the other end into the compression chamber which is closable by the at least one deflectable disc;

wherein each of the at least one deflectable discs have fluid flow apertures aligned with the rebound flow passage;

and wherein the compression stroke valve further comprises an annular stop member;

and an annular orientation disc positioned between the stop member and the deflectable discs on the side of the at least one deflectable disc remote from the piston;

the stop member and the orientation disc each having fluid flow apertures aligned with the fluid flow apertures in each of the at least one deflectable discs;

the orientation disc having a longitudinal pin folded therefrom and extending in a direction substantially parallel to the longitudinal axis, the longitudinal pin extending through corresponding disc apertures formed in each of the at least one deflectable discs into a corresponding slot formed in the piston;

and alignment means formed on the orientation disc and the stop member for aligning the orientation disc relative to the stop member;

wherein the orientation disc has two axially extending pins, and each of the at least one deflectable discs and piston have the corresponding disc apertures and slots to receive the two axially extending pins.

2. A shock absorber as claimed in claim 1, wherein the alignment means comprises a radially extending pin extending away from an outer edge of the orientation disc; and a corresponding radially extending groove formed in the stop member within which the radially extending pin is located.

3. A shock absorber as claimed in claim 1, wherein the alignment means comprises an axially extending pin extending away from the outer edge of the orientation disc; and a corresponding axially extending aperture or slot formed in the stop member within which the axially extending pin is located.

4. A shock absorber as claimed in claim 1, wherein the orientation disc is stamped from sheet metal.

5. A shock absorber comprising a tube and containing fluid;

a piston slidably mounted in the tube and separating a compression chamber and a rebound chamber within the tube;

a piston rod attached to the piston extending out of one end of the tube;

a compression stroke valve comprising at least one deflectable disc mounted on the piston;

a compression flow passage and a rebound flow passage extending through the piston wherein the compression stroke valve comprises at least one deflectable disc with at least one fluid flow aperture aligned with the rebound flow passage and a stop member;

an orientation disc positioned between the stop member and the at least one deflectable disc and having at least one longitudinal pin folded therefrom and parallel to a longitudinal axis of the piston rod, and extending through at least one corresponding disc apertures formed in the at least one deflectable disc and into at least one corresponding slot formed in the piston;

and alignment means formed on the orientation disc and the stop member for aligning the orientation disc relative to the stop member;

wherein the orientation disc has at least one axially extending pin, and the at least one deflectable disc and piston have the at least one corresponding disc aperture and the at least one corresponding slot to receive the at least one axially extending pin.

* * * * *